United States Patent [19]

Kobayashi et al.

[11] Patent Number: 5,735,729
[45] Date of Patent: Apr. 7, 1998

[54] ABRASIVE COMPOSITION WITH AN ELECTROLYTIC WATER AND A POLISHING PROCESS WITH THE USE OF SAID ABRASIVE COMPOSITION

[75] Inventors: Masatsune Kobayashi; Koji Takemasa, both of Yokohama, Japan

[73] Assignee: Canon Kabushiki Kaisha, Tokyo, Japan

[21] Appl. No.: 280,985

[22] Filed: Jul. 27, 1994

[30] Foreign Application Priority Data

Jul. 28, 1993 [JP] Japan .................. 5-204478

[51] Int. Cl.⁶ .................................................. B24B 31/00
[52] U.S. Cl. .......................... 451/36; 51/308; 451/41
[58] Field of Search .......................... 451/36, 37, 28, 451/104, 113, 41; 51/293, 308

[56] References Cited

U.S. PATENT DOCUMENTS

| | | | |
|---|---|---|---|
| 4,124,471 | 11/1978 | Lieb et al. | 204/180 P |
| 4,389,819 | 6/1983 | Williamson et al. | 451/36 |
| 4,631,184 | 12/1986 | Winyall et al. | 424/49 |
| 4,821,466 | 4/1989 | Kato et al. | 451/113 |
| 5,044,128 | 9/1991 | Nakano | 451/104 |
| 5,238,467 | 8/1993 | Hashiba et al. | 51/293 |
| 5,419,735 | 5/1995 | Imahashi et al. | 451/104 |
| 5,543,030 | 8/1996 | Shiramizu et al. | 205/464 |
| 5,578,193 | 11/1996 | Aoki et al. | 205/746 |
| 5,599,438 | 2/1997 | Shiramizu et al. | 205/746 |
| 5,626,509 | 5/1997 | Hayashi | 451/285 |
| 5,643,406 | 7/1997 | Shimomura et al. | 156/636.1 |

FOREIGN PATENT DOCUMENTS

| | | | |
|---|---|---|---|
| 0408229 | 1/1991 | European Pat. Off. | C02F 1/46 |
| 64-11693 | 1/1989 | Japan . | |
| 3-38293 | 2/1991 | Japan . | |
| 3-238084 | 10/1991 | Japan . | |
| 1712393 | 2/1992 | U.S.S.R. . | |

*Primary Examiner*—Robert A. Rose
*Attorney, Agent, or Firm*—Fitzpatrick, Cella, Harper & Scinto

[57] ABSTRACT

An abrasive composition comprising abrasive grains of an inorganic material dispersed in a dispersion medium, characterized in that said dispersion medium contains an electrolytic water. A process for polishing an object using said abrasive composition.

The abrasive composition enables to attain a high quality polish-finished surface at an improved polishing efficiency.

15 Claims, 1 Drawing Sheet

ABRASIVE COMPOSITION WITH AN ELECTROLYTIC WATER AND A POLISHING PROCESS WITH THE USE OF SAID ABRASIVE COMPOSITION

BACKGROUND OF THE INVENTION

1. Field of the Invention

The present invention relates to an improved abrasive composition and a process for polishing an object (a material to be treated) with the use of said abrasive composition. More particularly, the present invention relates to an improved abrasive composition which enables attaining a precisely polished surface for an object at an improved processing efficiency and a process for polishing an object with the use of said abrasive composition with improved processing efficiency wherein a precisely polished surface is provided for said object.

2. Related Background Art

There are known a number of abrasive processing methods for polishing the surface of an object (a material to be treated) using an abrasive composition comprising abrasive grains dispersed in a dispersion medium. Specifically, those abrasive finishing methods include abrasive finishing method, lapping method, blast finishing method (including sandblasting, shot peening, and liquid-honing methods), buffing method, and barrel finishing method. These surface processing methods are selectively employed depending upon the kind, hardness, or surface roughness of an object to be treated or other processing conditions involved.

In recent years, there has been an increased demand for attaining a polished surface with a high precision not only for optical lenses but also for other glass members such as glass substrates used in optical discs, active matrix type liquid crystal displays, and color filters for liquid crystal televisions, glass substrates for liquid crystal displays used in watches, electronic calculators, and cameras, glass substrates used in solar cell modules, and glass substrates used in LSI photomasks.

Further, in recent years, in the surface-processing of wafers including single crystal silicon wafers and compound semiconductor substrates which are frequently used as support members in integrated circuits, magnetic memory hard discs, and laser members, the requirement for the flatness of a processed-surface and the requirement for the presence of defects (including scratch, orange peel, pits, nodules, and crack) at a processed-surface have been remarkably advanced.

In addition to these factors, there is an increased demand for reducing the production cost by attaining an improvement in the productivity while reducing the quantity of defective products.

Now, for instance, in the case of polishing the surface of a glass member such as optical lens, glass substrate, or the like, there can be mentioned an abrasive composition as one of the processing conditions. The abrasive composition in this case basically comprises abrasive grains dispersed in a liquid medium as a dispersion medium. The abrasive grains are usually of cerium oxide, zirconium oxide or silicon dioxide. The liquid medium usually comprises water. As the water herein, there is usually used treated water obtained by subjecting ground water or tap water to ion-exchange treatment or filtration treatment. And the abrasive composition usually comprises a slurry comprising grains of one of the above mentioned inorganic compounds dispersed in the above mentioned treated water as the liquid medium.

However, any conventional surface processing method is accompanied by disadvantages in terms of the surface processing efficiency, specifically such that the productivity is poor in realization of a precisely polished state at the surface of an object, particularly in the case where the object comprises a material with a high hardness, and the rate of doing work per unit power is relatively small.

Under such circumstances as above described, there is an increased demand for attaining an improvement not only in the abrasive composition used but also in the processing precision and in the processing speed (or the polishing speed).

SUMMARY OF THE INVENTION

The present invention is aimed at eliminating the foregoing problems in the conventional polishing methods, complying with the foregoing demands, and providing an improved abrasive composition which enables to attain a precisely polish-finished surface for a material to be treated with improved processing efficiency.

Another object of the present invention is to provide an improved abrasive composition comprising grains of an abrasive dispersed in a dispersion medium comprising a specific electrolytic solution, which enables polishing a material to be treated so as to have a precisely polish-finished surface at an improved polishing speed and at an improved polish-processing efficiency.

A further object of the present invention is to provide an improved abrasive composition comprising grains of an abrasive dispersed in a dispersion medium comprising a specific electrolytic solution, which enables to attaining a precisely polish-finished surface for a material to be treated for a short period of time.

A further object of the present invention is to provide an improved abrasive composition comprising grains of an abrasive dispersed in a dispersion medium comprising a specific electrolytic solution, which enables to attain a precisely polish-finished surface for a material to be treated with the use of the abrasive in a relatively small amount wherein an abrasive pad is slightly worn or deteriorated.

A further object of the present invention is to provide a process for polishing a material to be treated with the use of the above described abrasive composition.

DETAILED DESCRIPTION OF THE INVENTION AND THE PREFERRED EMBODIMENTS

Figure 1:
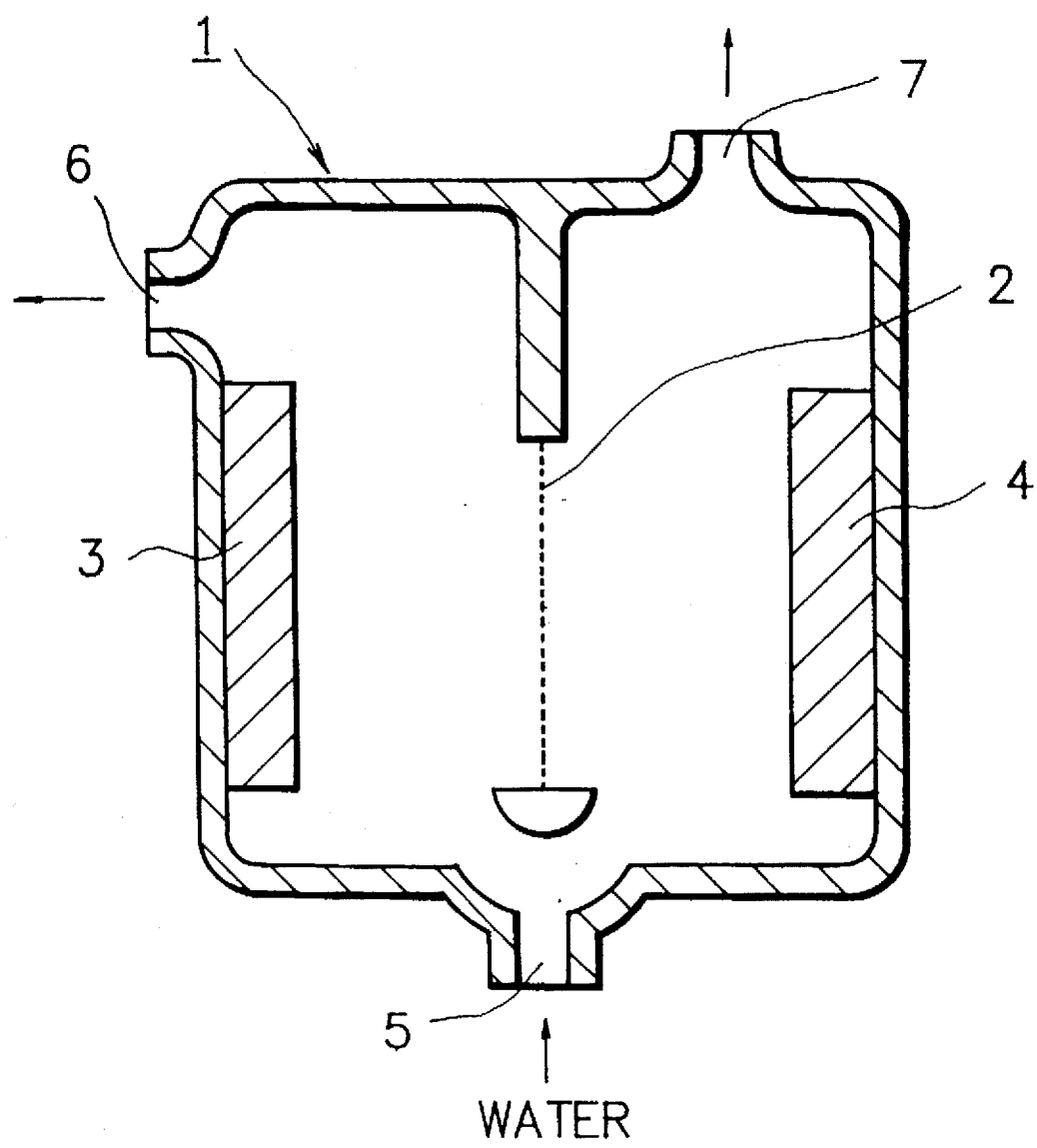
FIG. 1 is a schematic diagram illustrating an apparatus for producing an electrolytic water used in the present invention.

The present inventors made extensive studies in order to eliminate the foregoing problems in the conventional polishing technique while complying with the foregoing demands and in order to attain the object of the present invention. As a result, it was found that when a specific electrolytic water is incorporated into an abrasive composition, the abrasive composition enables eliminating the problems in the conventional polishing technique and complying with the demands and it enables attaining defect-free polish-finished surface excelling in quality for a material to be treated at an improved polish-finishing efficiency and at a markedly improved process speed without damaging the material.

The present invention has been accomplished based on this finding.

The present invention provides an improved abrasive composition comprising an abrasive dispersed in a dispersion medium containing an electrolytic water.

The abrasive composition according to the present invention is usable in any of the conventional surface-finishing methods wherein the abrasive composition enables to attain a precisely polish-finished defect-free surface for a material to be treated at an improved polishing efficiency and at a markedly improved process speed.

The present invention includes a process for polishing the surface of a material to be treated with the use of an abrasive composition, characterized in that as said abrasive composition, an abrasive composition comprising an abrasive dispersed in a dispersion medium containing an electrolytic water is used.

The process according to the present invention enables to attain polish-finishing of a material to be treated with the use of the abrasive in a relatively small amount at an improved polishing efficiency and at a markedly improved process speed wherein a precisely polish-finished defect-free surface is effectively provided for the material without damaging the material and wherein an abrasive pad is slightly worn or deteriorated.

A typical example of the electrolytic water used in the present invention is an electrolytic water obtained by subjecting given water to electrolytic treatment using an appropriate apparatus for producing an electrolytic water (this apparatus will be hereinafter referred to as electrolytic treatment apparatus), for example, of the constitution shown in FIG. 1.

In FIG. 1, reference numeral 1 indicates an entire electrolytic treatment apparatus, reference numeral 2 a diaphragm, reference numeral 3 an anode, reference numeral 4 a cathode, reference numeral 5 a water-supply port, reference numeral 6 a take-up port for anolyte, and reference numeral 7 a take-up port for catholyte. In the electrolytic treatment apparatus shown in FIG. 1, starting water is supplied into the electrolytic treatment apparatus 1 through the water-supply port 5, and a DC voltage is applied between the anode 3 and the cathode 4 wherein cation-containing water (hereinafter referred to as cathode water or catholyte) is gathered on the cathode 4 side and anion-containing water (hereinafter referred to as anode water or anolyte) is gathered on the anode 3 side. The catholyte is taken out through the take-up port 7, and the anolyte is taken out through the take-up port 6, wherein the catholyte is of an acidic property and the anolyte is of an alkaline property. According to the electrolytic treatment apparatus, there can be obtained an electrolytic water of a given pH value of 3 to 11 by properly adjusting the DC voltage applied between the anode and the cathode or the amount of the water taken out through either the take-up port 6 or the take-up port 7. Alternatively, an electrolytic water of a desired pH value can be obtained by properly selecting the position of the port through which either the anolyte or the catholyte is taken out.

Alternatively to the electrolytic treatment apparatus shown in FIG. 1, there can be used an electrolytic water-producing apparatus described in Japanese Unexamined Patent Publication No. 11693/1989, No. 38293/1991, or No. 238084/1991 for obtaining the electrolytic water used in the present invention.

The starting water used in the above may be ground water or tap water. Alternatively, it may be ion-exchanged water.

The electrolytic water used as the dispersion medium in the present invention may be either the above anolyte or the above catholyte. Alternatively, it may be electrolytic water obtained by subjecting either the anolyte or the catholyte to filtration treatment or ion exchange treatment.

The use of such electrolytic water having a desired pH value as the dispersion medium results in obtaining a desirable abrasive composition with a desired pH value without using any additive.

Thus, the abrasive composition according to the present invention may be properly adjusted to have a desired pH value which is compatible with the constituent of a material to be treated. Particularly, in the case where the material to be treated is a glass member which is liable to be corroded during the polishing operation due to the acidic or alkaline property of an abrasive composition used, the abrasive composition according to the present invention may be properly adjusted to have an appropriate pH value so that such glass member is not corroded due to the abrasive composition. Further, the pH value of the abrasive composition according to the present invention may be properly adjusted so that aggregation of the abrasive does not occur in the abrasive composition even in the case where it is stored over a long period of time.

The abrasive composition according to the present invention is further advantageous in that it is free of secondary effect-like problems including corrosion or wear of a polishing apparatus, and negative influences to a material so treated and that it is not harmful to the human body and it does not cause a drainage problem.

As above described, the electrolytic water used in the present invention may be either the anolyte (that is, the anode water) or the catholyte (or the cathode water). The cathode water comprises a cluster (an aggregate of water molecules) rich in cation and the anode water comprises a cluster rich in anion.

Incidentally, when abrasive grains having a property to bear positive charges around their periphery such as alpha-alumina particles are dispersed in ordinary water as a dispersion medium without using any dispersing agent or any dispersion stabilizing agent to thereby obtain an abrasive composition, the resultant abrasive composition is such that the abrasive grains (the alpha-alumina particles) are not dispersed in a desirable state wherein the abrasive grains are aggregated with each other.

The abrasive composition according to the present invention is free of such problem. That is, by using the cathode water rich in cations in the above case, there is afforded a desirable abrasive composition in which the abrasive grains are uniformly dispersed in the cathode water as the dispersion medium without the abrasive grains being aggregated, in spite of using no dispersing agent. The reason for this is believed to be that the positive charges of the abrasive grains (that is, the alpha-alumina particles) and the cations of the cathode water are mutually reacted to cause an electric repulsive force which enhances the abrasive grains to be dispersed in the cathode water in a state that the abrasive grains are not aggregated.

In the case of using abrasive grains having a property to bear negative charges around their periphery, it is desired to use the anode water rich in anion as the dispersion medium. In this case, there is afforded a desirable abrasive composition in which the abrasive grains are uniformly dispersed in the anode water as the dispersion medium without the abrasive grains being aggregated, in spite of using no dispersing agent. The reason for this is considered to be that the negative charges of the abrasive grains and the anions of the anode water are mutually reacted to cause an electric repulsive force which enhances the abrasive grains to be dispersed in the anode water in a state that the abrasive grains are not aggregated.

Thus, according to the present invention, a high quality abrasive composition in which abrasive grains are desirably dispersed without being aggregated is attained by using a specific electrolytic water comprising the foregoing cathode water or anode water as a dispersion medium without using any dispersing agent.

In the abrasive composition according to the present invention, the cathode water or anode water as the dispersion medium for the abrasive grains provides a surface activity. Because of this, when the abrasive composition is dedicated for polishing the surface of a material to be treated, the abrasive composition readily enters into the surface fine structure of the material whereby an excellently polish-finished surface is attained for the material at an improved polishing efficiency.

Now, the electrolytic water used in the present invention is smaller than ordinary water such as ground water or tap water in terms of the cluster. Particularly, ordinary water comprises a so-called compound of 18 in molecular weight and composed of one oxygen atom and two hydrogen atoms and it takes not such a structure in which water molecules are individually present but a so-called cluster structure comprising an aggregate of water molecules, because hydrogen bonds among the water molecules are strong.

Incidentally, in the reports at the 1991 March conference of the Japan Chemical Society, there are described that a mass of water molecules and the magnitude of a water cluster can be measured by the NMR (nuclear magnetic resonance) and that the measured results of $^{17}$O-NMR/water at a line width (20° C.) revealed 119 Hz for rainwater, 105 Hz for well water, 118 Hz for distilled water, and 59 Hz for electrolytic water (cathod water) wherein the smaller the measured value is, the smaller the water molecule mass or the water cluster is.

Based on the measured results by the NMR (nuclear magnetic resonance), the magnitude of the cluster of the electrolytic water used in the present invention was found to be ½ or less than that of ordinary water (ground water or tap water). It is considered that this situation wherein the electrolytic water is small in terms of the magnitude of the cluster contributes to making the abrasive grains to be desirably dispersed in the electrolytic water without the abrasive grains being aggregated, resulting in providing a high quality abrasive composition which can be maintained in a stable state with no occurrence of aggregation of the abrasive grains even when stored over a long period of time. And as above described, when the abrasive composition is dedicated for polishing the surface of a material to be treated, the abrasive composition readily enters into the surface fine structure of the material whereby a excellently polish-finished surface is attained for the material at an improved polishing efficiency.

Further, in the abrasive composition according to the present invention which is obtained by using a specific electrolytic water comprising the cathode water comprised of a cluster rich in cations or the anode water comprised of a cluster rich in anions as the dispersion medium, the cations or anions of the electrolytic water repel each other because of their electric repulsive force and the cluster of the electrolytic water is relatively small in terms of the magnitude. Because of this, when it is dedicated for polishing the surface of a material to be treated, there is provided a pronounced effect in that the dispersion medium comprising the electrolytic water is readily vaporized to effectively release heat generated upon polishing the surface of the material with the abrasive grains, whereby an excellently polish-finished surface is attained for the material at an improved polishing efficiency.

Further in addition, as above described, the abrasive composition according to the present invention is advantageous in that it is free of secondary effect-like problems including corrosion or wear of a polishing apparatus and negative influences to a material to be treated and that it is not harmful to the human body and it does not cause such drainage problems as found in the case of the conventional abrasive composition.

Now, as the abrasive grains used in the abrasive composition according to the present invention, there can be selectively used grains (or particles) of an appropriate inorganic material as long as they have a property of providing mechanical effects to the surface of a material to be treated upon polishing treatment. Specific examples of such inorganic material are natural inorganic materials such as natural diamond, corundum, spinel emery, garnet, and silica stone; and synthetic inorganic materials such as synthetic diamond, alundum, carborundum, boron carbide, lanthanum carbide, zirconium carbide, tungsten carbide, boron nitride, titanium nitride, zirconium nitride, titanium boride, ceric oxide, chromium oxide, and ferric oxide (Bengals). Other than these, there can be mentioned emery, silica sand, manganese steel ball, glass beads, powdery iron, and silica diatomaceous earth. These inorganic materials can be used either singly or in combination of two or more of them. In addition, there can be used barrel finishing medias.

The abrasive composition according to the present invention may be prepared in the same manner as in the case of preparing a conventional abrasive composition, except that the liquid dispersion medium used in the preparation of the conventional abrasive composition is replaced by the foregoing electrolytic water.

Incidentally, as the liquid dispersion medium used in the preparation of the conventional abrasive composition, there is used a fatty oil series liquid such as seed oil, olive oil, or the like or a petroleum series liquid such as light oil, machine oil, mineral oil, or the like. In the present invention, any of these fatty oil series liquids and petroleum series liquids which are used in the preparation of the conventional abrasive composition is not used. Hence, the present invention excludes a water-free abrasive composition.

In the present invention, the dispersion medium in which the abrasive grains are to be dispersed is desired to comprise the foregoing electrolytic water only. However, if necessary, the dispersion medium may contain ordinary water in a small amount.

In a preferred embodiment, the abrasive composition according to the present invention does not contain any additive such as a dispersing agent. However, it may contain an appropriate additive as long as it does not hinder the functions of the electrolytic water as the dispersion medium.

The electrolytic water used in the present invention is not limited only to those obtained in the foregoing manner using the electrolytic treatment apparatus but can include other treated water having the same physical properties as the electrolytic water has.

The abrasive composition according to the present invention is desirably applicable in any of the conventional polishing manners in which an aqueous abrasive composition is used.

In the following, the features and advantages of the present invention will be described in more detail with reference to examples, which are not intended to restrict the scope of the present invention.

EXAMPLE 1 AND COMPARATIVE EXAMPLE 1

Example 1

As a dispersion medium, there was obtained an electrolytic water comprising a cathode water of pH 8.8 by using a commercially available electrolytic water-producing apparatus (trademark name: MINESOFTMS-800, produced by Akai Electric Co., Ltd.).

970 g of powdery cerium oxide having a mean particle size of 1.15 μm and 3.5 lit. of colloidal silica (trademark name: NALCO-2350, produced by RODEL-NITTA Company) were introduced into 35 lit. of the cathode water as the electrolytic water to obtain a mixture. The mixture was well mixed and homogenized.

Thus, there was obtained an abrasive composition of 10.1 in pH value (hereinafter referred to as abrasive composition A).

Comparative Example 1

As a dispersion medium, there was provided distilled water.

970 g of powdery cerium oxide having a mean particle size of 1.15 μm and 3.5 lit. of colloidal silica (trademark name: NALCO-2350, produced by RODEL NITTA Company) were introduced into 35 lit. of the distilled water to obtained a mixture. The mixture was well mixed and homogenized.

Thus, there was obtained a comparative abrasive composition of 10.3 in pH value (hereinafter referred to as abrasive composition B).

Evaluation

As for each of the above abrasive compositions A and B, its polishing efficiency was evaluated in the following manner.

That is, there were provided 20 laminate samples of 140 mm (length)×4.2 mm (width) in size each comprising a 3 mm thick pyrex glass plate (produced by Corning Company) and a 1.1 mm thick silicon wafer being laminated through a 100 μm thick epoxy resin adhesive layer interposed between the pyrex glass plate and the silicon wafer.

Of these 20 laminate samples, 10 of them were subjected to polishing treatment using the abrasive composition A.

The remaining 10 laminate samples were subjected to polishing treatment using the abrasive composition B.

The polishing treatment was conducted for the longitudinal laminated face of each laminate sample by a commercially available polishing apparatus (trademark name: TLP1200, produced by Ichimura Seisakusho Kabushiki Kaisha) using an abrasive cloth made of foamed polyurethane (trademark name: CERIUMPAT KSP66A-1.25, produced by Kokonoe Electric Co., Ltd.) wherein said longitudinal laminated face was polished for an hour under conditions of 1.1 Kg for the load and 20 r.p.m. for the revolution speed.

In each case, the polishing efficiency was evaluated by measuring the polished amount, i.e., the thickness of a laminate portion removed by the polishing treatment, wherein a measuring instrument and a microscope were used. In addition, the polished face was evaluated by using a microscope.

The measured results with respect to the polishing efficiency in the case where the abrasive composition A was used are collectively shown in Table 1. In Table 1, there is also shown a mean value among the measured results.

The measured results with respect to the polishing efficiency in the case where the abrasive composition B was used are collectively shown in Table 2. In Table 2, there is also shown a mean value among the measured results.

Based on the evaluated results obtained, it was found that the polishing efficiency of the abrasive composition A is greater by as much as 33% over that of the abrasive composition B. The quality of the polish-finished face obtained in the case of using the abrasive composition A was found to be apparently better than that of the polish-finished surface obtained in the case of using the abrasive composition B.

EXAMPLE 2 AND COMPARATIVE EXAMPLES 2 AND 3

Example 2

As a dispersion medium, there was obtained an electrolytic water comprising a cathode water of pH 9.7 by using a commercially available electrolytic water-producing apparatus (trademark name: MINESOFTMS-800, produced by Akai Electric Co., Ltd.).

500 g of powdery cerium oxide having a mean particle size of 0.3 μm was introduced into 10 lit. of the cathode water as the electrolytic water to obtain a mixture. The mixture was well mixed and homogenized.

Thus, there was obtained an abrasive composition (hereinafter referred to as abrasive composition C).

Comparative Example 2

As a dispersion medium, there was provided distilled water.

500 g of powdery cerium oxide having a mean particle size of 0.3 μm was introduced into 10 lit. of the distilled water to obtained a mixture. The mixture was well mixed and homogenized.

Thus, there was obtained a comparative abrasive composition (hereinafter referred to as abrasive composition D).

Comparative Example 3

As a dispersion medium, there was provided water having a pH value of 9.7 obtained by adding sodium hydroxide (NaOH) to distilled water.

500 g of powdery cerium oxide having a mean particle size of 0.3 μm was introduced into 10 lit. of said water to obtained a mixture. The mixture was well mixed and homogenized.

Thus, there was obtained a comparative abrasive composition (hereinafter referred to as abrasive composition E).

Evaluation

As for each of the above abrasive compositions C, D and E, its polishing efficiency was evaluated in the following manner.

That is, there were provided 15 optical lenses made of LaSF and having a size of 33 mm (diameter)×10 mm (thickness). In the evaluation of the polishing efficiency as for each abrasive composition, 5 of said optical lenses were fixed on a disk of a conventional lapping apparatus wherein the five optical lenses were subjected to plane lapping treatment for 10 minutes by press-contacting an abrasive sheet made of urethane resin to the disk having the five optical lenses thereon at a polishing load of 100 g/cm² while rotating the disk at 80 r.p.m. and while supplying the abrasive composition at 200 ml/min. Then, as for each of the five lenses having been subjected to the plane lapping treatment, there was measured a reduction in the weight. The measured results are collectively shown in Table 3. In Table 3, there is also shown a mean value among the measured results. Based on the evaluated results obtained, it was found that the polishing efficiency of the abrasive composition C is greater as much as 41% over that of the abrasive composition D and as much as 28% over that of the abrasive composition E.

In addition, as for each of the five lenses treated by way of the plane lapping treatment obtained in the case of using each of the abrasive compositions C, D and E, its finished surface was observed by a microscope. As a result, it was found that the quality of the finished surface obtained using the abrasive composition C is apparently better than that of the finished surface obtained using any of the abrasive compositions D and E.

EXAMPLE 3 AND COMPARATIVE EXAMPLES 4 AND 5

Example 3

As a dispersion medium, there was obtained an electrolytic water comprising an anode water of pH 3.8 by using a commercially available electrolytic water-producing apparatus (trademark name: MINESOFTMS-800, produced by Akai Electric Co., Ltd.).

500 g of powdery cerium oxide having a mean particle size of 0.3 μm was introduced into 10 lit. of the anode water to obtained a mixture. The mixture was well mixed and homogenized.

Thus, there was obtained an abrasive composition (hereinafter referred to as abrasive composition F).

Comparative Example 4

As a dispersion medium, there was provided distilled water.

500 g of powdery cerium oxide having a mean particle size of 0.3 μm was introduced into 10 lit. of the distilled water to obtained a mixture. The mixture was well mixed and homogenized.

Thus, there was obtained a comparative abrasive composition (hereinafter referred to as abrasive composition G).

Comparative Example 5

As a dispersion medium, there was provided water having a pH value of 3.8 obtained by adding hydrochloric acid (HCl) to distilled water.

500 g of powdery cerium oxide having a mean particle size of 0.3 μm was introduced into 10 lit. of said water to obtained a mixture. The mixture was well mixed and homogenized.

Thus, there was obtained a comparative abrasive composition (hereinafter referred to as abrasive composition H).

Evaluation

As for each of the above abrasive compositions F, G and H, its polishing efficiency was evaluated in the following manner.

That is, there were provided 15 optical lenses made of LaSF and having a size of 33 mm (diameter)×10 mm (thickness). In the evaluation of the polishing efficiency as for each abrasive composition, 5 of said optical lenses were fixed on a disk of a conventional lapping apparatus wherein the five optical lenses were subjected to plane lapping treatment for 10 minutes by press-contacting an abrasive sheet made of urethane resin to the disk having the five optical lenses thereon at a polishing load of 100 g/cm² while rotating the disk at 80 r.p.m. and while supplying the abrasive composition at 200 ml/min. Then, as for each of the five lenses having been subjected to the plane lapping treatment, there was measured a reduction in the weight. The measured results are collectively shown in Table 4. In Table 4, there is also shown a mean value among the measured results. Based on the evaluated results obtained, it was found that the polishing efficiency of the abrasive composition F (wherein the weight reduction is 12.9 in terms of the mean value) is apparently surpassing that of the abrasive composition G (wherein the weight reduction is 9.7 in terms of the mean value) and also that of the abrasive composition H (wherein the weight reduction is 9.6 in terms of the mean value).

In addition, as for each of the five lenses treated by way of the plane lapping treatment obtained in the case of using each of the abrasive compositions F, G and H, its finished surface was observed by a microscope. As a result, it was found that the quality of the finished surface obtained using the abrasive composition F is apparently better than that of the finished surface obtained using any of the abrasive compositions G and H.

EXAMPLE 4 AND COMPARATIVE EXAMPLE 6

Example 4

As a dispersion medium, there was obtained an electrolytic water comprising a cathode water of pH 9.1 by using a commercially available electrolytic water-producing apparatus (trademark name: MINESOFTMS-800, produced by Akai Electric Co., Ltd.).

Powdery alpha-alumina having a mean particle size of 0.5 μm was dispersed into the cathode water to obtained a slurry composition containing the alpha-alumina at a content of 5.5 wt.%. The slurry composition was well mixed and homogenized.

Thus, there was obtained an abrasive composition (hereinafter referred to as abrasive composition I).

Comparative Example 6

As a dispersion medium, there was provided distilled water.

Powdery alpha-alumina having a mean particle size of 0.5 μm was dispersed into the distilled water to obtained a slurry composition containing the alpha-alumina at a content of 5.5 wt.%. The slurry composition was well mixed and homogenized.

Thus, there was obtained a comparative abrasive composition (hereinafter referred to as abrasive composition J).

Evaluation

As for each of the above abrasive compositions I and J, its polishing efficiency was evaluated in the following manner.

That is, there were provided 10 disc samples of 90 mm in outer diameter each comprising a nickel-plated aluminum substrate.

Of these 10 disc samples, 5 of them were subjected to polishing treatment using the abrasive composition I.

The remaining 5 disc samples were subjected to polishing treatment using the abrasive composition J.

The polishing treatment for each disc sample was conducted using a conventional double side-polishing apparatus with opposite press platens each having a polishing pad disposed thereon for 3 minutes, wherein the disc sample was placed between the opposite polishing pads and the opposite polishing pads were moved while press-contacting each of them to one of the two surfaces of the disc sample at a polishing load of 100 g/cm$^2$ and while supplying the abrasive composition between the opposite polishing pads at 320 cc/minute.

In each case, the polishing efficiency was evaluated in terms of the polishing speed. The polishing speed was examined by measuring a reduction of the thickness of each side of the disc sample and obtaining a mean reduced thickness among the two reduced thicknesses of the both sides of the disc sample. The resultant mean reduced the thicknesses with respect to the polishing speed obtained in the case of using the abrasive composition I and in the case of using the abrasive composition J are collectively shown in Table 5. In Table 5, there are also shown a mean value among the measured results obtained in the case of using the abrasive composition I and a mean value among the measured results obtained in the case of using the abrasive composition J.

Based on the evaluated results obtained, it was found that the polishing efficiency of the abrasive composition I (wherein the thickness reduction is 0.49 in terms of the mean value) is apparently surpassing that of the abrasive composition J (wherein the thickness reduction is 0.30 in terms of the mean value).

In addition, as for each of the five disc samples each having the two surfaces having been polish-finished obtained in the case of using each of the abrasive compositions I and J, its two polish-finished surfaces were observed by a microscope. As a result, it was found that the polish-finished surfaces obtained using the abrasive composition I are apparently better than those obtained using the abrasive composition J in terms of the quality.

EXAMPLE 5 AND COMPARATIVE EXAMPLE 7

Example 5

As a dispersion medium, there was obtained an electrolytic water comprising a cathode water of pH 8.3 by using a commercially available electrolytic water-producing apparatus (trademark name: MINESOFTMS-800, produced by Akai Electric Co., Ltd.).

Powdery alundum No. 120 was mixed with the cathode water with a mixing ratio of 1:1 in terms of the weight ratio. To the resultant, 1.3 wt. % of liquid paraffin as an anti-corrosive agent and 2 wt. % of a wetting agent comprising Pelex OPT (trademark name, produced by Kao-Atlas Kabushiki Kaisha) were added to obtain a mixture. The resultant mixture was well mixed and homogenized.

Thus, there was obtained an abrasive composition for liquid honing treatment (hereinafter referred to as abrasive composition K).

Comparative Example 7

As a dispersion medium, there was provided distilled water.

Powdery alundum No. 120 was mixed with the distilled water with a mixing ratio of 1:1 in terms of the weight ratio. To the resultant, 1.3 wt. % of liquid paraffin as an anti-corrosive agent and 2 wt. % of a wetting agent comprising Pelex OPT (trademark name, produced by Kao-Atlas Kabushiki Kaisha) were added to obtain a mixture. The resultant mixture was well mixed and homogenized.

Thus, there was obtained a comparative abrasive composition for liquid honing treatment (hereinafter referred to as abrasive composition L).

Evaluation

As for each of the above abrasive compositions K and L, its polishing efficiency was evaluated in the following manner.

That is, there were provided 10 metal member samples each comprising a brass plate composed of BSPI-1/2 H (described in the JIS).

Of these 10 metal member samples, 5 of them were subjected to liquid honing treatment using the abrasive composition K.

The remaining 5 metal member samples were subjected to liquid honing treatment using the abrasive composition L.

The liquid honing treatment for each metal member sample was conducted using a conventional liquid honing apparatus for 2 minutes, wherein the surface of the metal member sample was honed with the abrasive composition supplied through the honing nozzle of 2 mm in diameter at 3 Kg/cm$^2$ whereby the surface of the metal member sample was mat-finished.

In each case, the polishing efficiency was evaluated by measuring a reduction of the weight of the metal member sample. The measured results with respect to the polishing efficiency obtained in the case of using the abrasive composition K and in the case of using the abrasive composition L are collectively shown in Table 6. In Table 6, there are also shown a mean value among the measured results obtained in the case of using the abrasive composition K and a mean value among the measured results obtained in the case of using the abrasive composition L.

Based on the evaluated results obtained, it was found that the polishing efficiency of the abrasive composition K (wherein the weight reduction is 0.53 in terms of the mean value) is apparently surpassing that of the abrasive composition L (wherein the weight reduction is 0.20 in terms of the mean value).

In addition, as for each of the five metal member samples each having a mat-finished surface obtained in the case of using each of the abrasive compositions K and L, its mat-finished surface was observed by a microscope. As a result, it was found that the mat-finished surfaces obtained using the abrasive composition K are apparently better than those obtained using the abrasive composition L in terms of the quality.

TABLE 1

| the thickness (mμ) of a laminate portion removed by abrasive composition A | | | | | mean value |
|---|---|---|---|---|---|
| 15.7 | 14.3 | 14.0 | 17.3 | 15.7 | 15.6 |
| 15.7 | 14.3 | 15.3 | 16.3 | 16.0 | |

TABLE 2

| the thickness (mμ) of a laminate portion removed by abrasive composition B | | | | | mean value |
|---|---|---|---|---|---|
| 13.4 | 10.8 | 12.4 | 11.5 | 9.0 | 11.7 |
| 12.2 | 14.2 | 12.0 | 11.4 | 12.0 | |

TABLE 3

| | the reduced amount by the polishing treatment (mg) | | | | | mean value |
|---|---|---|---|---|---|---|
| abrasive composition C | 13.9 | 13.5 | 14.0 | 13.6 | 13.7 | 13.7 |
| abrasive composition D | 9.9 | 10.2 | 9.8 | 10.0 | 9.8 | 9.9 |
| abrasive composition E | 10.9 | 10.8 | 11.2 | 10.6 | 11.0 | 10.9 |

TABLE 4

| | the reduced amount by the polishing treatment (mg) | | | | | mean value |
|---|---|---|---|---|---|---|
| abrasive composition F | 12.9 | 12.8 | 13.1 | 12.7 | 12.9 | 12.9 |
| abrasive composition G | 9.8 | 9.7 | 9.9 | 9.6 | 9.5 | 9.7 |
| abrasive composition H | 9.6 | 9.7 | 9.6 | 9.6 | 9.4 | 9.6 |

TABLE 5

| | mean polishing speed (μm/min) | | | | | mean value |
|---|---|---|---|---|---|---|
| abrasive composition I | 0.53 | 0.49 | 0.50 | 0.48 | 0.45 | 0.49 |
| abrasive composition J | 0.29 | 0.31 | 0.30 | 0.29 | 0.30 | 0.30 |

TABLE 6

| | the reduced amount by the polishing treatment (mg) | | | | | mean value |
|---|---|---|---|---|---|---|
| abrasive composition K | 0.51 | 0.56 | 0.50 | 0.57 | 0.53 | 0.53 |
| abrasive composition L | 0.21 | 0.18 | 0.20 | 0.22 | 0.19 | 0.20 |

What is claimed is:

1. An abrasive composition suitable for polishing an object, comprising abrasive grains of an inorganic material dispersed in a dispersion medium, wherein said dispersion medium comprises an aqueous medium containing cathode water or anode water.

2. The abrasive composition according to claim 1, wherein the cathode water is obtained by subjecting water to electrolysis.

3. The abrasive composition according to claim 1, wherein the abrasive grains have a property of bearing positive charges at their periphery, and said abrasive grains are used together with the cathode water.

4. The abrasive composition according to claim 1, wherein the anode water is obtained by subjecting water to electrolysis.

5. The abrasive composition according to claim 1, wherein the abrasive grains have a property of bearing negative charges at their periphery, and said abrasive grains are used together with the anode water.

6. The abrasive composition according to claim 1, wherein the inorganic material comprises one or more members selected from the group consisting of natural diamond, corundum, spinel emery, garnet, silica stone, synthetic diamond, alundum, carborundum, boron carbide, lanthanum carbide, zirconium carbide, tungsten carbide, boron nitride, titanium nitride, zirconium nitride, titanium boride, ceric oxide, chromium oxide, and ferric oxide.

7. The abrasive composition according to claim 1, wherein the abrasive grains comprise emery, silica sand, manganese steel ball, glass beads, powdery iron, or powdery silica diatomaceous earth.

8. A polishing process comprising:

contacting a surface of an object to be polished with an abrasive composition; and applying a relative motion between the surface of the object and the abrasive composition;

wherein the abrasive composition comprises abrasive grains of an inorganic material dispersed in a dispersion medium, said dispersion medium comprises an aqueous medium containing a cathode water or an anode water.

9. The process according to claim 8, wherein the cathode water is obtained by subjecting water to electrolysis.

10. The process according to claim 8, wherein the abrasive grains have a property of bearing positive charges at their periphery, and said abrasive grains are used together with the cathode water.

11. The process according to claim 8, wherein the anode water is obtained by subjecting water to electrolysis.

12. The process according to claim 8, wherein the abrasive grains have a property of bearing negative charges at their periphery, and said abrasive grains are used together with the anode water.

13. The process according to claim 8, wherein the inorganic material comprises one or more members selected from the group consisting of natural diamond, corundum, spinel emery, garnet, silica stone, synthetic diamond, alundum, carborundum, boron carbide, lanthanum carbide, zirconium carbide, tungsten carbide, boron nitride, titanium nitride, zirconium nitride, titanium boride, ceric oxide, chromium oxide, and ferric oxide.

14. The process according to claim 8, wherein the abrasive grains comprise emery, silica sand, manganese steel ball, glass beads, powdery iron, or powdery silica diatomaceous earth.

15. The process according to claim 8, wherein the object is a glass member.

* * * * *

UNITED STATES PATENT AND TRADEMARK OFFICE
CERTIFICATE OF CORRECTION

PATENT NO. : 5,735,729

DATED : April 7, 1998

INVENTOR(S) : MASATSUNE KOBAYASHI, ET AL.  Page 1 of 2

It is certified that error appears in the above-identified patent and that said Letters Patent is hereby corrected as shown below:

COLUMN 1

Line 13, "at an" should read --with--.

COLUMN 2

Line 18, "to attain" should read --attaining--;
    Line 32, "to" should be deleted;
    Line 38, "to attain" should read --attaining--;
    Line 63, "attaining" should read --attaining a--.

COLUMN 3

Line 8, "to attain" should read --attaining--;
    Line 17, "to" should be deleted;
    Line 18, "attain" should read --attaining--.

COLUMN 5

Line 35, "cathod" should read --cathode--.

COLUMN 6

Line 30, "medias" should read --media--.

COLUMN 9

Line 12, "as much" should read --by as much--.

UNITED STATES PATENT AND TRADEMARK OFFICE
CERTIFICATE OF CORRECTION

PATENT NO. : 5,735,729
DATED : April 7, 1998
INVENTOR(S) : MASATSUNE KOBAYASHI, ET AL.

It is certified that error appears in the above-identified patent and that said Letters Patent is hereby corrected as shown below:

COLUMN 10

Line 40, "obtained" should read --obtain--;
    Line 52, "obtained" should read --obtain--.

COLUMN 11

Line 18, "reduced the" should read --reduced--.
    Line 22, "are" should read --is--.

Signed and Sealed this

Twenty-second Day of December, 1998

Attest:

BRUCE LEHMAN

*Attesting Officer*    *Commissioner of Patents and Trademarks*